United States Patent
Claus

[11] Patent Number: 6,119,504
[45] Date of Patent: Sep. 19, 2000

[54] DEVICE FOR MEASURING WEAR IN LARGE ROLLER BEARINGS

[75] Inventor: Wolfgang Claus, Lippetal, Germany

[73] Assignee: Thyssen Krupp AG, Düsseldorf, Germany

[21] Appl. No.: 09/170,926

[22] Filed: Oct. 13, 1998

[30] Foreign Application Priority Data

Dec. 11, 1997 [DE] Germany .......................... 197 55 000

[51] Int. Cl.[7] ..................................................... G01N 3/56
[52] U.S. Cl. ................................. 73/7; 384/448; 116/208
[58] Field of Search .................... 73/7; 384/448; 116/208

[56] References Cited

U.S. PATENT DOCUMENTS

| | | | |
|---|---|---|---|
| 4,092,053 | 5/1978 | Riegler et al. | 384/448 |
| 4,095,552 | 6/1978 | Lo | 116/208 |
| 4,509,364 | 4/1985 | Schutz et al. | 73/7 |
| 4,584,865 | 4/1986 | Hutchins | 73/7 |

FOREIGN PATENT DOCUMENTS

| | | |
|---|---|---|
| 2 232 756 | 9/1998 | Canada . |
| 0 856 733 A1 | 8/1998 | European Pat. Off. . |

Primary Examiner—Max Noori
Attorney, Agent, or Firm—Max Fogiel

[57] ABSTRACT

A device for measuring wear in large roller bearings that have two bearing rings (1 & 2) with space accommodating the rollers (3) between them. The device has an indicator that indicates a prescribed deflection between the rings and a probe (9) that is accommodated in an opening (10) in the outer bearing ring (2) with the end (11) of the probe able to come into contact with one of the surfaces of the inner bearing ring (1). The object is a device that will provide accurate and reliable indications of bearing wear even after years of use, that will be simple in design, and that cannot be damaged or destroyed by outside forces. The inner bearing ring accordingly has a groove (12) facing the probe, and the end of the probe extends into the groove. The surfaces of the groove are as far from the end of the probe as the maximal permissible depth of the wear on the bearing.

7 Claims, 2 Drawing Sheets

DEVICE FOR MEASURING WEAR IN LARGE ROLLER BEARINGS

BACKGROUND OF THE INVENTION

The present invention concerns a device for measuring wear in large roller bearings. Large roller bearings in the sense of the present invention are ball bearings, cylinder bearings, or combinations thereof that are hollow in that they are not provided with an essentially solid shaft. At least one ring is accordingly fastened to the main component by screws that parallel the bearing's axis of rotation.

The lives of all roller bearings, and accordingly of large roller bearings, are limited by the eventual destruction of their races or rollers. It is difficult to predict when this destruction will occur in that it depends to a large extent on the material, method of manufacture, and application. It usually begins with pitting, especially of the races, which are usually softer than the rollers. The pitting constantly worsens and leads to pea-sized or bean-sized fragmentation of the race. If the bearing continues in use, these fragments can in turn lead to larger-scale fractionation of the material that can suddenly freeze the bearing and lead to breakdown of the overall equipment, a shovel, crane, or bulldozer for instance.

Because of their size and the need to fit them to a particular piece of equipment, it often takes several months to individually manufacture large roller bearings for such applications. Since they are also often used far from where they are manufactured, it can also take several weeks to ship them. Downtimes of several months can accordingly be expected, and spare bearings must be kept on hand, an undesirable investment, especially if they are never needed because the originals turn out to last long enough.

German OS 2 418 056 discloses attaching a device to the bearing that indicates a prescribed displacement in one direction between the rings. There is, however, a drawback to this device in that it is mounted outside the bearing's accommodation and accordingly exposed to damage and destruction. It also depends on a probe with one end always resting against the relatively revolving ring, which can lead to wear over time and accordingly to misleading indications of a bearing problems that have not yet occurred.

U.S. Pat. No. 4,092,053 discloses inserting a probe through an opening in a bearing ring, whereby the end of the probe constantly slides over the relatively moving surface of the ring. The sliding motion, however, is not essential here because the probe is employed for determining weight and can regularly be replaced. Furthermore, weighing devices are easy to calibrate at any time. Still, this probe would be subject to the same drawbacks as the one disclosed in the aforesaid German OS 2 418 056 if it were employed for measuring wear.

SUMMARY OF THE INVENTION

The object of the present invention is an improved wear-measuring device of the aforesaid genus that will provide accurate and reliable indications of bearing wear even after years of use, that will be simple in design, and that cannot be damaged or destroyed by outside forces.

The embodiment recited in Claim 5, whereby the end of the probe is associated with a groove is particularly resistant to destruction. When this characteristic is combined with protecting the probe against outside forces by a seal as recited in Claim 6 or against contact with oil or particles abraded off within the roller-accommodation space by another seal or with both of these features, the advantage will be a wear-detection device that can long function reliably.

BRIEF DESCRIPTION OF THE DRAWINGS

One embodiment of the present invention will now be specified with reference to the accompanying drawing, wherein.

DESCRIPTION OF THE PREFERRED EMBODIMENTS

Figure 1:
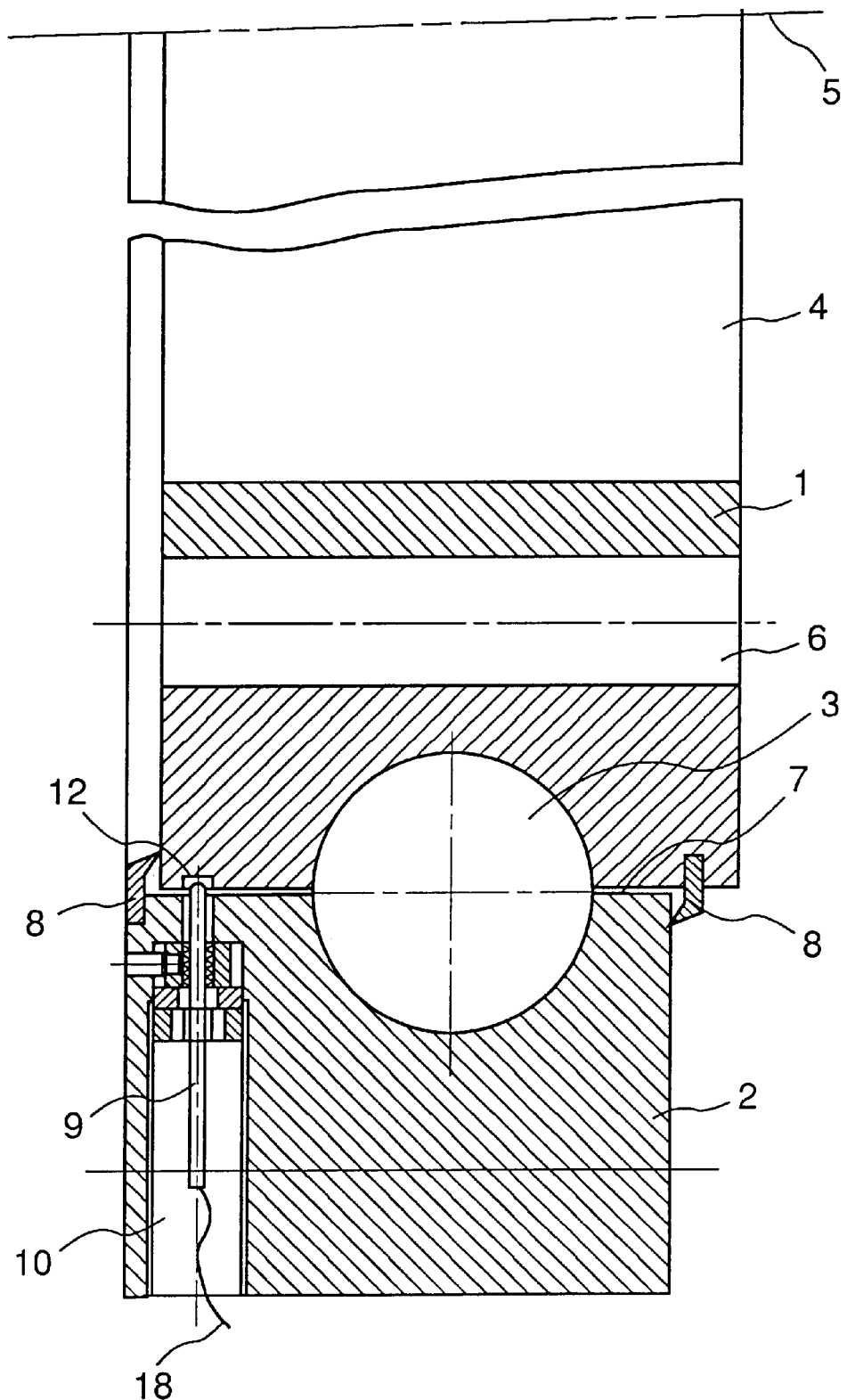
FIG. 1 is a section through one half of a large roller bearing and FIG. 2 is a larger-scale detail of part of FIG. 1.

The large roller bearing has an inner bearing ring 1 and an outer bearing ring 2 with rollers 3 in the form of balls, cylinders, or barrels accommodated between them. The rollers 3 in the particular embodiment illustrated are balls. Either inner bearing ring 1 or outer bearing ring 2 or both can be composed of subsidiary rings or segments.

The bore 4 through the center of the inner ring in large roller bearings in the sense of the present invention is usually left essentially free, meaning that the inner ring usually does not accommodate a solid shaft. At least one of the rings is accordingly fastened to the rest of the bearing by screws paralleling the bearing's axis 5 of rotation. The bore through the inner bearing ring 1 in the present embodiment is accordingly surrounded by several screw-accommodation bores 6.

The space that accommodates rollers 3 is usually full of lubricant, oil for example, which can be prevented from leaking out by unillustrated seals in the gap 7 between bearing rings 1 and 2. Such seals will also prevent contaminants from invading the roller-accommodation space. Instead of or in addition to the aforesaid seals between the roller-accommodation space and gap 7, bearing rings 1 and 2 can be provided with seals 8 to seal the outside of the gap as illustrated in FIG. 1.

The wear-measuring device includes a probe 9 that extends through an opening 10 radial to the bearing's axis 5 of rotation. The end 11 of probe 9 extends beyond the inner surface of outer bearing ring 2 and loosely into but without actually contacting a groove 12 appropriately located in inner bearing ring 1.

Figure 2:
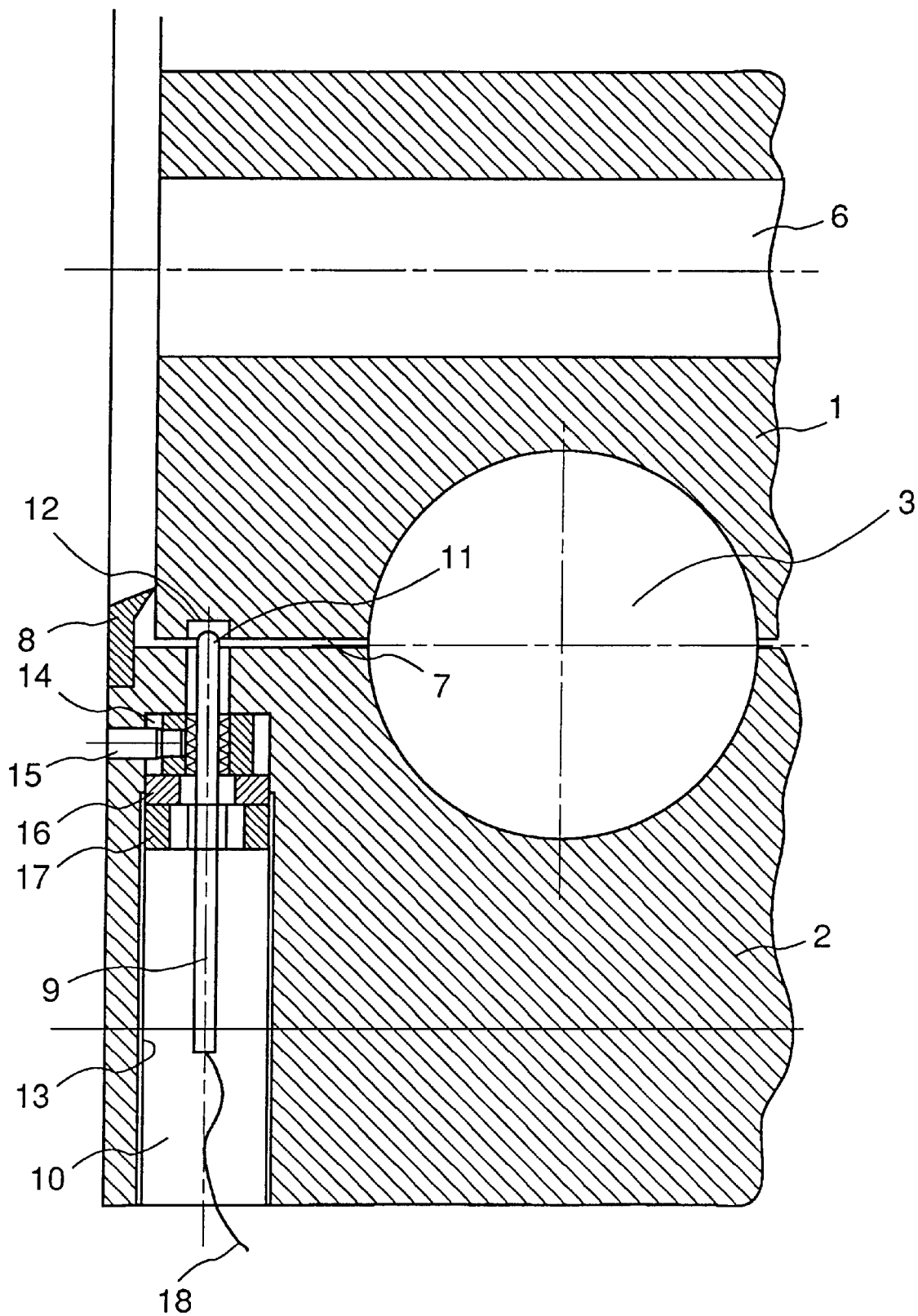

As will be evident from FIG. 2, the end 11 of probe 9 is separated from the walls of groove 12 by the maximal permissible displacement of bearing rings 1 and 2 toward each other as the bearing wears out. The specific displacement can be prescribed as the bearing is assembled. The total gap between the end 11 of probe 9 and the sides of groove 12 is the difference between the width of the gap and the thickness of the end of the probe. This dimension is easy to adjust by varying the thickness of the end of the probe. The advantage is that grooves and probe-accommodation spaces and fastenings of one size can be employed for various total permissible-wear depths. The opening 10 that accommodates the probe 9 in the illustrated embodiment is a bore with an inner thread 13. The diameter and thread dimensions can also be the same in all versions of the embodiment hereintofore specified.

Probe 9 is secured axially and radially in a holder 14. Since holder 14 is thinner than opening 10 is wide, its position inside the opening can be varied. The position is varied by means of a setscrew 15 that adjusts probe 9 in relation to axis 5 of rotation and hence at an angle to groove 12. Various axial distances between groove 12 and the end 11 of probe 9 can accordingly be established once the total distance has been prescribed by the thickness of the probe's end. The prescribed radial distance between the end 11 of the probe 9 and the base of groove 12 in terms of axis 5 of rotation is established by displacing the probe in holder 14 and securing it there. The probe can for example be cemented to or sealed onto the holder. Holder 14 is then secured in opening 10 by a compression ring 16 and nut 17.

Probe 9 is electrically insulated from outer bearing ring 2. In the present embodiment it is insulated by a layer of insulation in the opening 10 that accommodates holder 14. Bearing rings 1 and 2 are electrically connected. The communication is generally by way of the metal-to-metal contact between inner bearing rings 1 and 2 by way of roller 3. Once the rings have approached each other to the maximal permissible extent due to wear on the bearing's race, the end 11 of probe 9 will come into contact with one of the surfaces of groove 12, electrically connecting probe 9 to outer bearing ring 2, which it is mounted on. The signal generated by the closed circuit can be transmitted to alarms or processors by electric lines connected to probe 9 and outer bearing ring 2. The operator will accordingly be informed that wear on the bearing has progressed to the extent that the component will soon be destroyed and that appropriate action needs to be taken.

Information that the prescribed maximal wear on the bearing has occurred can also be otherwise provided. One alternative that is not illustrated herein is to accommodate probe 9 such that it will deflect when its end 11 comes into contact with groove 12 and will transmit that information to the alarms or processors.

List of Components 1. inner bearing ring
2. outer bearing ring
3. roller
4. central bore
5. axis of rotation
6. screw accommodation bore
7. bearing gap
8. seal
9. probe
10. opening
11. end of probe
12. groove
13. inside thread
14. holder
15. setscrew
16. compression ring
17. nut
18. current-conducting line

What is claimed is:

1. An arrangement for measuring wear in large roller bearings, comprising: two bearing rings having an inner ring and an outer ring with a space for receiving rollers between said bearing rings; indicator means for indicating a specific deflection between said rings; probe means secured in an opening in said outer ring; said probe having an end for contacting a surface of said inner ring, said inner ring having a groove with walls facing said probe, said end of said probe extending into said groove without contacting said walls of said groove; said groove having surfaces located as far from said end of said probe as the maximum permissible depth of wear on said bearing; said end of said probe being spaced from said walls of said groove for as long as wear on said bearing is less than said maximum permissible depth of wear; said end of said probe contacting said walls of said groove when said permissible depth of wear is exceeded and becoming connected thereby to said indicator means; said wear on said bearing being measurable in both radial and axial directions; said probe means being adjustably secured in radial and axial direction in said opening in said outer ring.

2. An arrangement as defined in claim 1, wherein said probe means is electrically insulated from said outer ring, said probe means being mounted on said bearing rings and between said bearing rings by an electrical connection.

3. An arrangement as defined in claim 1, including means for detecting deflections of said probe means, said probe means being fastened to said outer ring by said means for detecting said deflections.

4. An arrangement as defined in claim 1, wherein said opening in said outer ring extends radially relative to an axis of rotation of said bearings.

5. An arrangement as defined in claim 1, wherein said groove and said end of said probe means are located adjacent a gap between said bearing rings and outside said space accommodating said rollers.

6. An arrangement as defined in claim 5, including sealing means outside said space accommodating said rollers and beyond said end of said probe means for sealing off said gap between said bearing rings from the environment.

7. An arrangement as defined in claim 5, including sealing means between said space accommodating said rollers and said end of said probe means and in said gap between said bearing rings.

* * * * *